Patented Mar. 2, 1926.

1,575,521

UNITED STATES PATENT OFFICE.

DON C. ATKINS, OF DENVER, COLORADO.

PROCESS OF TREATING WOOD, METAL, AND CONCRETE.

No Drawing.   Application filed May 2, 1922.   Serial No. 557,998.

*To all whom it may concern:*

Be it known that I, DON C. ATKINS, a citizen of the United States, residing at Denver, in the county of Denver and State of Colorado, have invented certain new and useful Improvements in Processes of Treating Wood, Metal, and Concrete, of which the following is a specification.

This invention relates to a process for oil proofing, water proofing, acid proofing and the preserving of wood, metal and concrete by applying to the surface, or impregnating the material to be treated with a compound or compounds hereinafter set forth, which is insoluble in and impervious to oil, acid, alkali, water and not affected by the elements.

The said substance is formed and produced by a chemical reaction between sulphur chloride, or sulphur, or sulphur chloride and gasoline with a drying or semi-drying oil or oils; whereby the unsaturated part of the oil or oils becomes saturated forming a substance that has the properties above stated.

It has been the custom heretofore to oilproof concrete by either mixing some finely divided material with the concrete at the time the concrete is made, or by applying an inorganic compound such as a silicate or a substance forming a silicate to the surface of the concrete. The first process has the disadvantage of the concrete still having interstitial space between the particles of cement and the filler, thus permitting capillary attraction. The filler also tends to weaken the concrete. The second process has the disadvantage that the material will not adhere uniformly to the cement, and also has a different expansion and contraction factor which permits a cracking, checking and peeling of the protective coat, thereby exposing the concrete.

The methods heretofore commonly used for water-proofing cement are to either mix the finely divided material, such as calcium hydrate in with the concrete when it is made, or by applying a coat of tar, asphaltum, or a paint with asphaltum base to the surface. The same disadvantages hold true for a finely divided filler as above stated in the oil-proofing process, and more especially so if the water contains certain natural salts, such as potassium, or sodium sulphate, carbonate, etc. The method of coating the surface with tar, asphalt, or an asphaltum paint, is undesirable inasmuch as this coating will give a peculiar taste and odor to the water for a long time; secondly, when the surface that has been coated is exposed to the sun or warm water it will either run or crack. This coating can not be used on containers that are to hold a mixture of oil and water, as the oil will dissolve the coating and allow the oil to pass through the concrete.

The process commonly used for acid-proofing, and water-proofing the surfaces of metal and wood, is to coat them with a paint or tar. This process has the same disadvantages as named above and also owing to the fact that the tar and asphaltum paint carry a certain amount of free carbon which has no adhesive properties, and also a different expansion factor which will in time permit the acid to penetrate to the surface of the treated material.

There are many methods and processes for the preserving of wood. Some depend upon the toxic properties of the coating or impregnating material. These materials are inorganic, or semi-inorganic compounds which, as a rule, have little or no adhering properties, thus permitting the checking, cracking and peeling of the protective coat. The compounds often completely lose their adhesive properties and their toxic properties when coming in contact with oil or long exposure to the elements. These salts used in these protective coatings are often hydroscopic, thereby attracting water to the treated material. There are processes for the treatment of wood that use oils, such as creosote oil, or a mixture of creosote oil and inorganic salts, as a fibre coating or impregnating agent. These depend upon their toxic properties for the preserving and protection of the wood. They furnish no protection against mechanical deterioration, such as freezing. These preserving agents are soluble to a large extent in oils, especially light oils, and will dissolve when in contact with them, thereby losing their usefulness.

The purpose of the present invention is to produce and apply a substance that is very dense, insoluble in oils, acids, alkali, and unaffected by the elements. This substance when applied to metal, wood, or concrete, will not permit the passage of oil, acid, alkali, or air through it to the treated material; as for example, concrete tanks coated on the inside with this substance will not permit crude oils or gasoline to pass through the concrete thereby leaking out.

The preparation of this substance may be performed in many ways, some of which are later herein stated. I prefer in making this substance, but do not limit myself either in material used or quantity of material, or procedure, to use an oil that has a high degree of unsaturation, such as a linseed oil. I may use either drying or semi-drying oil. It is preferred that this linseed oil be kept cool by some such means as a water jacket surrounding the mixing tank while a mixture of sulphur chloride, which has been previously mixed with an equal volume of gasoline, is slowly poured in and thoroughly mixed with the oil.

The percentage of linseed oil ranges from 90 to 99%, depending upon the freshness of the oil, and the mixture of equal volumes of gasoline and sulphur chloride ranges from 1 to 10%, depending upon the sulphur chloride and purity of the linseed oil.

This mixture can either be sprayed, brushed or impregnated into the materials to be treated. I prefer to spray the mixture upon the materials to be treated as this will give a more uniform coating. However, the choosing of the method of application is governed by local requirements; for instance, the amount of surface to be treated, or the number of pieces may not warrant the cost of installation for spraying or impregnating, while again it might be more economical to install the necessary equipment for impregnation process as when there would be a large number of pieces to be treated.

This preparation may be also applied in the following manner:

Where a cooling tank may not be had, or the facilities for cooling are limited, as might be in the case where the surface to be treated is very small and rather difficult to get to, the materials to be treated may be sprayed, coated or impregnated with sulphur chloride dissolved in some solvent such as gasoline, followed with an application of a drying or semi-drying oil, such as linseed oil. Sufficient linseed oil must be used to give to the materials treated, a protective coating over the surface, and a sufficient amount of sulphur chloride dissolved in gasoline to re-act with the linseed oil, the percentages will be within the ranges stated above.

I claim:

1. The process of treating the surfaces of materials which includes subjecting said surfaces to a treatment of sulfur chloride and a drying oil.

2. The process of treating the surfaces of materials which includes subjecting the said surfaces to a treatment of sulfur chloride mixed with a drying oil.

3. The process of treating the hardened surfaces of materials which consists in subjecting the said surfaces to a treatment of a solution of sulfur chloride mixed with a drying oil and followed by an application of sulfur chloride.

4. The process of treating the surfaces of materials which includes subjecting the said surfaces to an application of sulfur chloride dissolved in gasoline and mixed with linseed oil.

In testimony whereof I affix my signature.

DON C. ATKINS.